Nov. 8, 1938.  D. E. GOMMEL  2,135,891
SAW SET
Filed Nov. 7, 1934
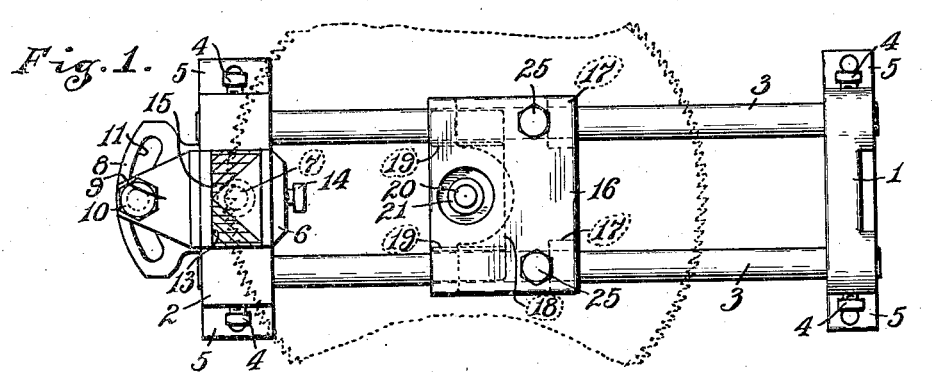
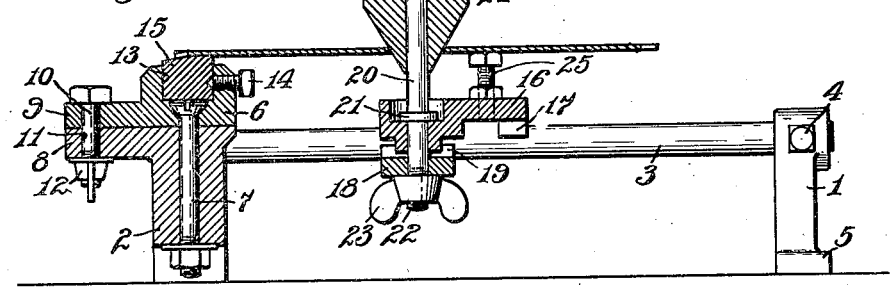
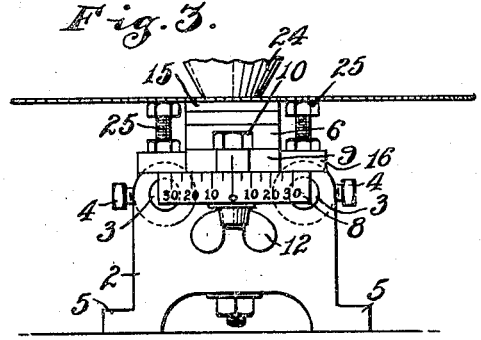
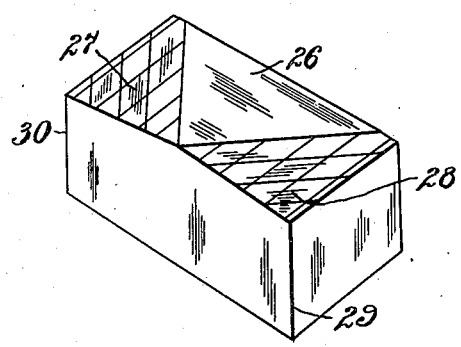
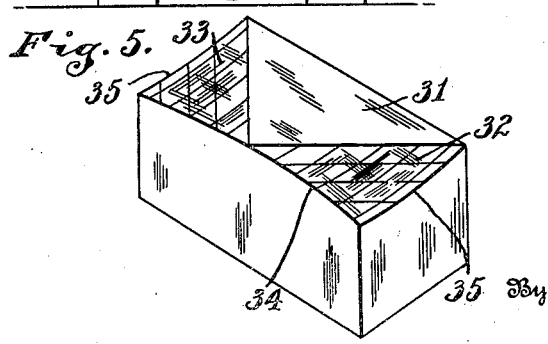
Inventor
Dewey E. Gommel,
Hood + Hahn.
Attorneys Patented Nov. 8, 1938

2,135,891

UNITED STATES PATENT OFFICE 2,135,891

SAW SET

Dewey E. Gommel, Indianapolis, Ind., assignor to E. C. Atkins and Company, Indianapolis, Ind., a corporation of Indiana Application November 7, 1934, Serial No. 751,830

2 Claims. (Cl. 76—73)

My invention relates to saw-setting devices and has for one of its objects the provision of a saw-setting device, particularly adapted for setting the teeth of circular saws, which provides means for readily and easily setting teeth of any desired length and imparting to the teeth any desired set.

For the purpose of disclosing my invention I have illustrated one embodiment thereof in the accompanying drawing in which Fig. 1 is a plan view of a setting apparatus embodying my invention;

Fig. 2 is a longitudinal sectional view thereof;

Fig. 3 is a front elevation;

Fig. 4 is a perspective view of one type of anvil which I employ, and

Fig. 5 is a perspective view of a modified form of anvil which I employ.

In the embodiment of the invention illustrated I provide a base which comprises end members 1 and 2 connected by a pair of parallel rods 3 which are fitted in sockets in the end members and held therein by suitable clamp screws 4. The end members are provided with feet as at 5 for supporting the base as above constructed. The front end member is also provided with a swivel anvil support 6 which is rotatably mounted on the top of the front end member and is swiveled thereon through the instrumentality of a swivel bolt 7 which extends through the bottom of the anvil-receiving pocket and through the end member. For maintaining the anvil support in any of its adjusted positions I provide an extension lip 8 on the end member 2 and an extension lip 9 on the anvil support. A bolt 10 extends through an opening in the extension 9 and operates in an arcuate slot 11 in the lip 8, being provided on its bottom with a clamping nut 12.

The top of the support 6 is provided with an anvil-receiving recess or pocket 13 preferably of the configuration of the anvil member, and a set screw 14 passes through the wall of the anvil support and engages in a recess in the anvil 15 which is adapted to be seated in this pocket.

A saw-supporting slide 16 is adjustable longitudinally on the base and is provided with grooved lugs 17 fitting slidably on the rods 3. A clamp 18 is arranged on the under side of the rods 3 and is provided with positioning ribs 19 cooperating with the rods 3. This clamp through the instrumentality of the spindle 20 is adapted to clamp the saw support in any of its adjusted positions. The saw-carrying spindle 20 extends vertically from the support 16, being provided with a collar 21 bearing against the upper face of the support 16 and with a threaded end 22 extending through the clamp 18 and adapted to receive a clamping wing nut 23. The upwardly extending portion of the spindle 20 provides a spindle adapted to project through the center opening of the saw and this spindle is provided with a saw centering cone 24. The above construction provides a support for the saw which may be adjusted to position the saw teeth at any desired point relative to the anvil 15 and to maintain this relative position during the rotation of the saw for setting the various teeth thereof. The support 16 is also provided with a pair of supporting screws 25 to support the saw at its proper vertical height relative to the anvil 15.

The anvil may take either the form illustrated in Fig. 4 or the form illustrated in Fig. 5. As shown in the structure illustrated in Fig. 4, the anvil preferably comprises a rectangular block of hardened steel. The top surface of this block is provided with a horizontal triangular surface 26 and a pair of downwardly inclined triangular surfaces 27 and 28. The bases of these surfaces constitute the two sides of the triangle of the surface 26 and the apexes of these sloping triangular surfaces coincide with the corners 29 and 30 of the block. In the structure illustrated in Fig. 4 these surfaces 28 and 27 are flat and are inclined from the base of the triangle to the apex.

In the structure illustrated in Fig. 5 the block is provided with a triangular surface 31 corresponding to the triangular surface 26 and being perfectly horizontal. A pair of triangular surfaces 32 and 33 corresponding to the surfaces 28 and 27 are also provided. However, in this instance one of the sides 34 of the triangle of the surfaces 32 and 33 is convexed at the edge of the block and the other side 35 is concaved, the intermediate portion of the surface being curved to merge these two curvatures.

If desired, in each instance the sloping surfaces of the anvil may have etched thereon positioning lines.

The operation of the structure is obvious. The saw is mounted on the spindle and the teeth adjusted to overhang the sloping surfaces to the extent desired to impart the proper setting to the saw. The tooth may then be struck on the top by a suitable hammer which, due to the configuration of the surface, will not only impart to the tooth lateral deflection, but also the twist desired. In operation alternate teeth are set on one surface of the anvil and then by inverting the saw the other teeth may be set on the other surface.

I claim as my invention:

1. A saw setting anvil having a triangular flat surface and surfaces sloping away from two sides of said triangle, said sloping surfaces having merging convex and concave portions.

2. A saw setting anvil having a flat triangular surface and triangular surfaces sloping away from said flat surface, said sloping surfaces being concaved at one edge and merging into a convex portion at the other edge.

DEWEY E. GOMMEL.